US006790045B1

(12) United States Patent
Drimmer (10) Patent No.: US 6,790,045 B1
(45) Date of Patent: Sep. 14, 2004

(54) METHOD AND SYSTEM FOR ANALYZING STUDENT PERFORMANCE IN AN ELECTRONIC COURSE

(75) Inventor: Alan Drimmer, Chicago, IL (US)

(73) Assignee: UNext.com LLC, Deerfield, IL (US)

( * ) Notice: Subject to any disclaimer, the term of this patent is extended or adjusted under 35 U.S.C. 154(b) by 149 days.

(21) Appl. No.: 09/884,168

(22) Filed: Jun. 18, 2001

(51) Int. Cl.$^7$ ................................................ G09B 7/00
(52) U.S. Cl. ...................... 434/336; 434/353; 434/362
(58) Field of Search ............................... 434/336, 353, 434/362, 118, 350

(56) References Cited

U.S. PATENT DOCUMENTS

| | | | |
|---|---|---|---|
| 4,238,893 A | 12/1980 | Komatsubara et al. | |
| 4,772,206 A | 9/1988 | Kerr et al. | |
| 4,786,255 A | 11/1988 | Hiramatsu et al. | |
| 4,820,167 A | 4/1989 | Nobles et al. | |
| 4,846,693 A | 7/1989 | Baer | |
| 4,877,404 A | 10/1989 | Warren et al. | |
| 5,002,491 A | 3/1991 | Abrahamson et al. | |
| 5,006,987 A | 4/1991 | Harless | |
| 5,267,865 A | 12/1993 | Lee et al. | |
| 5,273,433 A | 12/1993 | Kaminski et al. | |
| 5,310,349 A | 5/1994 | Daniels et al. | |
| 5,393,071 A | 2/1995 | Best | |
| 5,395,243 A | 3/1995 | Lubin et al. | |
| 5,441,415 A | 8/1995 | Lee et al. | |
| 5,597,312 A | 1/1997 | Bloom et al. | |
| 5,724,262 A | 3/1998 | Ghahramani | |
| 5,727,950 A | 3/1998 | Cook et al. | |
| 5,788,508 A | 8/1998 | Lee et al. | |
| 5,810,599 A | 9/1998 | Bishop | |
| 5,810,605 A | 9/1998 | Siefert | |
| 5,813,863 A | 9/1998 | Sloane et al. | |
| 5,823,781 A | 10/1998 | Hitchcock et al. | |
| 5,823,788 A | 10/1998 | Lemelson et al. | |

(List continued on next page.)

FOREIGN PATENT DOCUMENTS

WO  WO 98/22864  5/1998

OTHER PUBLICATIONS

Co-pending application US Ser. No. 09/746, Strub et al., "Administrator and Instructor Course Management Application for an Online Education Course".*

U.S. patent application Ser. No. 09/746,592, Strub et al., filed Dec. 21, 2000.

Richard E. Osgood, *The Conceptual Indexing of Conversational Hypertext*, Jun. 1994 (a doctoral dissertation that was or may be accessible to the public via the Northwestern University LIbrary, Evanston, Illinois).

(List continued on next page.)

*Primary Examiner*—Jessica Harrison
*Assistant Examiner*—Chanda L. Harris
(74) *Attorney, Agent, or Firm*—Brinks Hofer Gilson & Lione (57) ABSTRACT

A method and system for analyzing student performance defines student performance by classifying student performance into discrete performance classifications associated with corresponding activities related to the electronic course. An observed student performance level for at least one of the performance classifications is measured. A benchmark performance level or range is established for one or more of the performance classifications. It is determined whether the observed student performance level is compliant with the established benchmark performance level for the at least one performance classification. Instructive feedback is determined for the observed student based upon any material deviation of the observed student performance from at least one of the following: the benchmark performance level, the benchmark performance range, a group of benchmark performance levels, and group of benchmark performance ranges.

10 Claims, 5 Drawing Sheets

U.S. PATENT DOCUMENTS

| | | | |
|---|---|---|---|
| 5,864,869 A | | 1/1999 | Doak et al. |
| 5,882,202 A | | 3/1999 | Sameth et al. |
| 5,885,083 A | | 3/1999 | Ferrell |
| 5,909,589 A | | 6/1999 | Parker et al. |
| 5,947,747 A | * | 9/1999 | Walker et al. .......... 434/354 X |
| 5,957,699 A | | 9/1999 | Peterson et al. |
| 5,974,446 A | | 10/1999 | Sonnenreich et al. |
| 5,978,648 A | | 11/1999 | George et al. |
| 5,987,443 A | | 11/1999 | Nichols et al. |
| 6,002,915 A | | 12/1999 | Shimizu |
| 6,014,134 A | | 1/2000 | Bell et al. |
| 6,021,119 A | | 2/2000 | Derks et al. |
| 6,024,577 A | | 2/2000 | Wadahama et al. |
| 6,029,043 A | | 2/2000 | Ho et al. |
| 6,033,226 A | * | 3/2000 | Bullen .................... 434/219 X |
| 6,039,575 A | | 3/2000 | L'Allier et al. |
| 6,064,856 A | | 5/2000 | Lee et al. |
| 6,064,865 A | | 5/2000 | Kuo et al. |
| 6,106,399 A | | 8/2000 | Baker et al. |
| 6,126,448 A | | 10/2000 | Ho et al. |
| 6,141,528 A | | 10/2000 | Remschel |
| 6,149,441 A | | 11/2000 | Pellegrino et al. |
| 6,157,808 A | | 12/2000 | Hollingsworth |
| 6,162,060 A | | 12/2000 | Richard et al. |
| 6,164,974 A | | 12/2000 | Carlile et al. |
| 6,196,846 B1 | | 3/2001 | Berger et al. |
| 6,210,272 B1 | | 4/2001 | Brown |
| 6,261,103 B1 | | 7/2001 | Stephens et al. |
| 6,275,812 B1 | | 8/2001 | Haq et al. |
| 6,282,404 B1 | | 8/2001 | Linton |
| 6,283,760 B1 | | 9/2001 | Wakamoto |
| 6,296,487 B1 | | 10/2001 | Lotecka |
| 6,301,462 B1 | * | 10/2001 | Freeman et al. ........ 434/350 X |
| 6,301,571 B1 | * | 10/2001 | Tatsuoka .................. 706/45 X |
| 6,302,698 B1 | | 10/2001 | Ziv-El |
| 6,324,282 B1 | | 11/2001 | McIllwaine et al. |
| 6,325,632 B1 | | 12/2001 | Chao et al. |
| 6,341,960 B1 | | 1/2002 | Frasson et al. |
| 6,347,333 B2 | | 2/2002 | Eisendrath et al. |
| 6,353,447 B1 | * | 3/2002 | Truluck et al. .......... 345/733 X |
| 6,358,053 B1 | | 3/2002 | Rosenfield et al. |
| 6,364,667 B1 | | 4/2002 | Heinberg |
| 6,370,355 B1 | | 4/2002 | Ceretta et al. |
| 6,370,494 B1 | | 4/2002 | Mizuno et al. |
| 6,386,883 B2 | | 5/2002 | Siefert |
| 6,405,226 B1 | | 6/2002 | Alpert et al. |
| 6,411,796 B1 | | 6/2002 | Remschel |
| 6,470,171 B1 | | 10/2002 | Helmick et al. |
| 6,523,007 B2 | * | 2/2003 | Layng et al. ........... 704/270 X |
| 2002/0076677 A1 | * | 6/2002 | Wasowicz et al. .......... 434/178 |
| 2002/0098468 A1 | * | 7/2002 | Barrett et al. ............... 434/322 |
| 2002/0160347 A1 | * | 10/2002 | Wallace et al. ............. 434/322 |
| 2002/0187463 A1 | * | 12/2002 | Walker et al. .............. 434/362 |
| 2003/0087223 A1 | * | 5/2003 | Walker et al. .............. 434/353 |

OTHER PUBLICATIONS

"Teachers Assistant: A web–based Application using Java Server pages and Java Database Connectivity" —Susamma Barua–2000—IEEE (pp.: 828–833).

"Web–based Virtual Classroom" —Vladimir Trijkovic, Danco Davcev, Goran Kimovski and Zaneta Petanceska—2000—IEEE (pp.: 137–146).

"The Virtual Learning Environment System" —Anup Kumar, Raj Pakala R.K. Ragade and J.P. Wong—1998—IEEE (pp.: 711–716).

Yahoo! Internet Life Magazine Names Dakota State University the #12 Most Wired College in the Country, [online] [retreived on Nov. 23, 1998] retrieved from the Internet: <URL: http:/www.dsu.edu/yahoo.htm>.

DSU Open Internet Courses, [online] [retrieved on Nov. 23, 1998] retreived from the Internet: <URL: http:/www.courses.dsu.edu/disted/courses.htm>.

Menu Pages for "The Commons", [online] [retrieved on Nov. 5, 1998] retreived from the Internet: <URL: http://www.wcc–eun.com/win/commons/index.html>.

Home Pages For University Without Walls At the Unviersity of Massachusetts Amherst, [online] [retreived on Nov. 5, 1998] retreived from the internet: <URL: http://www.klaat-u.oit.umass.edu/uww/uww_home.html>.

Slide Show of Information Relating To Online Educational Programs, [online] [retrieved on Nov. 5, 1998] retrieved from the Internet: <URL:http://www.howardcc.edu/hcc/facpres/sld003.htm (Slides 3–13 of 14)>.

ADEC and Virtual Universities "Toward Common Vision and Action", [online] [retrieved on Nov. 5, 1998] retreived from the Internet: <URL: http://www.adec.edu/vuniv/adec/place1.html.

SINEwave The COB Virtual Campus (Distance Learning at the College of Business at UCB), [online] [retrieved on Nov. 5, 1998] retrieved from the Internet: <URL: http://www-.colorado.edu//ed/infs/jcbs/inewave/service/virtualcampus/>.

Welcome to the California Virtual University, [online] [retrieved on Nov. 5, 1998] retreived from the Internet: <URL: http://www.california.edu/about.html>.

Article Discussing Design of Online University: Johnstone/Jones: Western Governors University, [online] [retrieved on Nov. 5, 1998] retrieved from the Internet: <URL: http://www.ttu.edu/lists/acw–1/9707/0078.html>.

Web Pages Relating To Western Governors University Website at [online] [retrieved on Nov. 5, 1998] retrieved from the Internet: <URL: http://www.wgu.edu/wgu/academics/dist_learning/html>.

Website for the University of Phoenix Online Campus, [online] [retrieved on Nov. 5, 1998] retrieved from the Internet: <URL: http://www.uophx.edu/online/on1_camp.htm.

Printout of Website for: The Electronic University Network, [online] [retrieved on Nov. 5, 1998] retrieved from the Internet: <URL: http://www.wcc–eun.com/eun.html>.

Website Entitled Brevard Community College Online . . . Telecommute on the Information Super Highway with BCC, [online] [retrieved on Nov. 5, 1998] retrieved from the Internet: <URL: http://brevard.cc.fl.us/online/campus/>.

Web Page Entitled "Welcome to . . . Apollo Group, Inc.", [online] [retrieved on Nov. 5, 1998] retrieved from the Internet: <URL: http://www.apollogrp.com/>.

Micron University Home Page Entitled "Micron U", [online] [retrieved on Nov. 4, 1998] retrieved from the Internet: <URl: http://programs.micronpc.com/micro.  .  . OL1RTR4UWVPBGP3&where=home&why=gen>.

Meyrowitz, "Intermedia: The Architecture and Construction of an Object–Oriented Hypermedia System and Applications Framework", OOPSLA '86 Proceedings published Sep. 1986.

Bonar et al., "An Object–Oriented Architecture For Intelligent Tutoring Systems", OOPSLA '86 Proceedings published Sep. 1986.

Weyer et al., "A Prototype Electronic Encyclopedia", ACM Transactions on Office Information Systems, vol. 3, No. 1, Jan. 1985, pp. 63–88.

Morris et al. "Andrew: A Distributed Personal Computing Environment", Communications of the ACM, Mar. 1986, vol. 29, No. 3.

Wiseman, "Teaching (Virtually) Teaching", [online] [retreived on Nov. 23, 1998] retrieved from the Internet: <URL: http://gsula1.gsu.edu/faculty/lawppw/vtt/virtua.html>.

Patent Abstracts of Japan, English Abstract for Japanese Application Publication No. 08235089 "Education Support System" Published Sep. 13, 1996.

Patent Abstracts of Japan, English Abstract for Japanese Application Publication No. 10040199 "Education Support System" Published Feb. 13, 1998.

* cited by examiner

METHOD AND SYSTEM FOR ANALYZING STUDENT PERFORMANCE IN AN ELECTRONIC COURSE

FIELD OF THE INVENTION

This invention relates to a method and system for analyzing student performance in an electronic course.

BACKGROUND OF THE INVENTION

In a traditional setting where courses are taught in a physical classroom, the instructor and multiple students interact on a personal level. The instructor is able to observe the student's facial expressions, tone of voice, non-verbal cues and verbal cues as to the level of the student's comprehension. Although many efficiencies are realized by moving the classroom into the digital domain and offering classes on-line or over a communications network, an instructor may not be able to observe personally the facial expressions, tone of voice, or other indications of the student's comprehension.

In a traditional classroom setting, an instructor may primarily rely upon one or more exams and assignments to evaluate the student's performance. While the grading of assignments and exams offers the opportunity to conveniently assign a grade to the student's performance, such feedback may not be timely enough or sufficiently responsive to allow students to learn or improve their performance in the course. Thus, a need exists for analyzing student performance in the context of an electronic course to compensate for the absence of personal face-to-face interaction between an instructor and a student. Further, the need exists for analyzing student performance in an electronic course in a manner that may provide continuous realtime or otherwise up-to-date feedback on student performance so that the student may experience an enhanced learning process.

SUMMARY

The method and system for analyzing student performance defines student performance by classifying student performance into discrete performance classifications associated with corresponding activities related to the electronic course. An observed student performance level for at least one of the performance classifications is measured. A benchmark performance level or range is established for one or more of the performance classifications. It is determined whether the observed student performance level is compliant with the established benchmark performance level for the at least one performance classification. Instructive feedback is determined for the observed student based upon any material deviation of the observed student performance from at least one of the following: the benchmark performance level, the benchmark performance range, a group of benchmark performance levels, and group of benchmark performance ranges. The teacher or instructor may communicate and revise the instructive feedback (e.g., a suggested communication to the observed student) as deemed appropriate to the student to tailor it to the student's background to enhance the student's educational learning experience.

In accordance with the invention, a method and system for analyzing student performance in an electronic course supports the provision of instructive feedback on a continuous or real-time basis. Further, the instructive feedback may be tailored toward an individual student or a selected group of students, rather than directed toward an entire population of students, who are enrolled in an electronic course, to better enhance the learning process.

DETAILED DESCRIPTION

Figure 1:
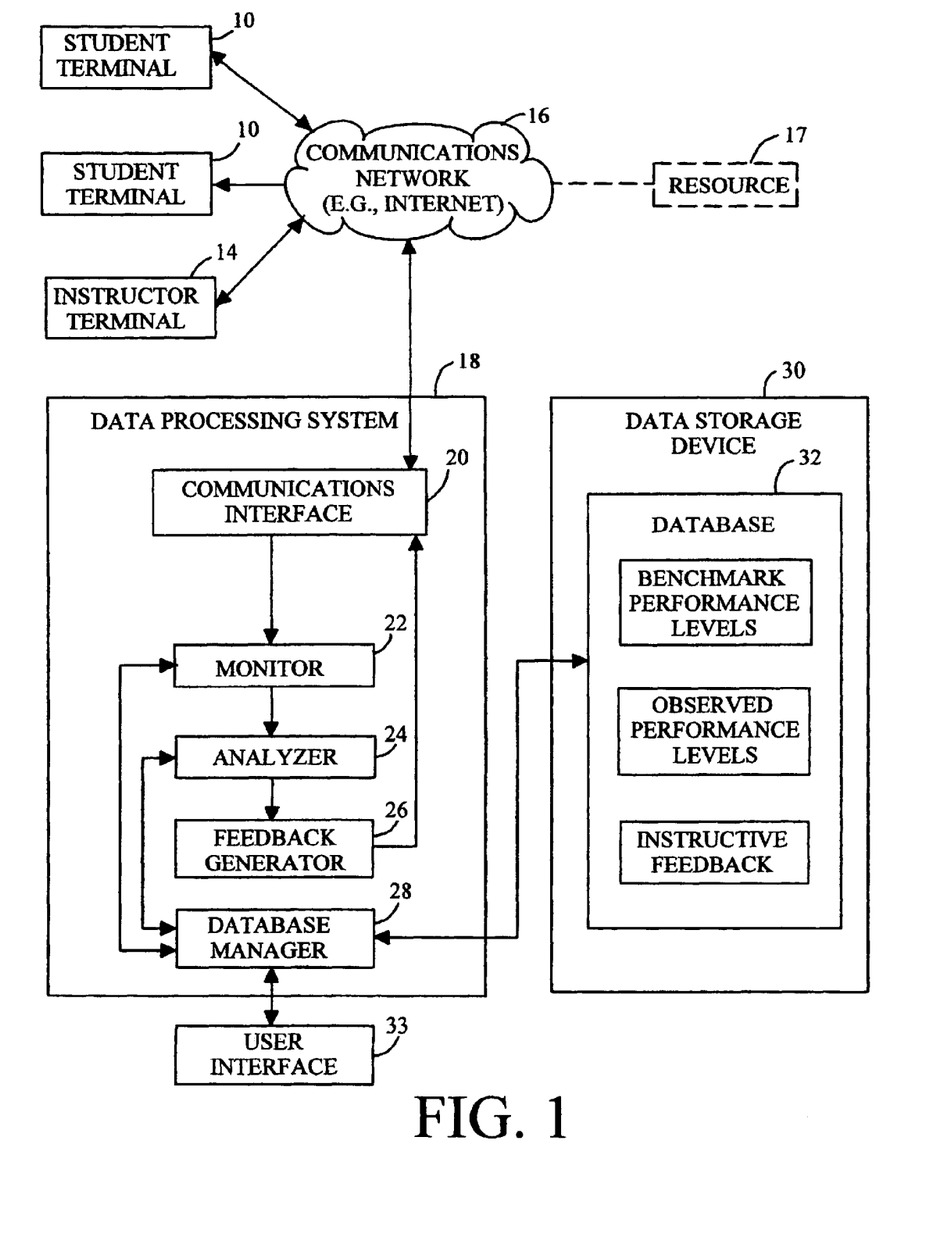
FIG. 1 is a block diagram of a system for analyzing student performance in an electronic course in accordance with the invention.

In accordance with the invention, FIG. 1 includes one or more student terminals 10 that communicate with a data processing system 18 via a communications network 16 (e.g., the Internet). In addition, an instructor terminal 14 may be coupled to the communications network 16 so as to communicate with the student terminals 10, the data processing system 18, or both. In one embodiment, the instructor terminal 14 is arranged to communicate with one or more student terminals 10 via the communications network 16 and/or the data processing system 18. The data processing system 18 is associated with a data storage device 30 which may house a database 32.

The data processing system 18 includes a communications interface 20 that may support communications with student terminals 10, instructor terminals 14, and a resource 17 via the communications network 16. The resource 17 of FIG. 1 is indicated by dashed lines to show that the resource 17 is optional. The resource 17 may represent a server that supports the delivery of educational material or presentations to student terminals 10 via the communications network 16, for example.

The communications interface 20 is coupled to a monitor 22. In turn, the monitor 22 is coupled to an analyzer 24. The analyzer 24 is associated with a feedback generator 26 that may support the delivery of instructional feedback to the student terminal 10. The feedback generator 26 may output instructive feedback to the communications network 16 via the communications interface 20.

The data processing system 18 includes a database manager 28 for managing querying, data storage and data retrieval of a database 32 stored in the data storage device 30. A user interface 33 is coupled to the data processing system 18 or the database manager 28 for entering user input into the data processing system 18, the database 32, or both.

The monitor 22 classifies student performance into discrete classifications associated with corresponding activities related to an electronic course. The user interface 33 supports the establishing of a benchmark performance level or range for each of the classifications. The benchmark performance level may be stored in a look-up table in a graphical form or as mathematical equations. The monitor 22 monitors or measures observed student performance levels associated with students in an electronic course.

An analyzer 24 analyzes student performance of an individual student with respect to one or more discrete classifications to determine whether the observed student performance level meets the benchmark performance level or range. For example, the analyzer 24 determines whether the observed student performance meets a benchmark performance level or materially deviates from a benchmark performance level.

The material deviation from the benchmark performance level may be defined in qualitative terms, quantitative terms, or both. For example, for a material deviation in the context of quantitative terms, an observed performance level may deviate from a benchmark performance level by a certain minimum threshold percentage amount over a certain minimum duration interval of the course. The instructor or the on-line educational institution may establish numeric, qualitative, or quantitative guidelines for benchmark performance levels or ranges via the user interface 33. If the student's observed performance level deviates by more than a minimum threshold percentage (e.g., ten percent) from the benchmark level over a minimum duration interval (e.g., a period of two weeks) in any of the classifications, the instructor terminal 14 or the student terminal 10 may be notified by the data processing system 18 via the communications network 16.

In one embodiment, the analyzer 24 compares the observed student performance level of a student to an observed performance level or range for a benchmark student in the electronic course. If the analyzer 24 detects a material deviation in the measured student performance from the benchmark level of student performance, the analyzer 24 generates a deficient performance indicator associated with a student indentifier. The deficient performance indicator and the student identifier are forwarded from the analyzer 24 to the feedback generator 26.

The feedback generator 26 may cooperate with the database 32 to retrieve instructive feedback from the database 32 or may conduct a logical analysis of the deficiency indicated by the deficient performance indicator to develop an instructional feedback (e.g., corrective action). The instructional feedback may be based upon the material deviation of the student performance from the benchmark level or range. For example, the feedback generator 26 may identify the instructive feedback for the observed student based upon the material deviation of the student performance from the benchmark level with regard to the particular performance classification of the deficiency.

The feedback generator 26 provides instructional feedback or a precursor thereto in conformance with one or more alternate techniques. Under a first feedback management technique, the feedback generator 26 provides preliminary feedback to an instructor terminal 14. The instructor terminal 14 may accept or revise the preliminary feedback to form revised or approved instructive feedback for transmission to one or more student terminals 10 via the communications network 16.

Under a second feedback management technique, the instructor terminal 14 may send instructive feedback to students or the feedback generator 26 may provide feedback directly to the a student terminal 10 without intervention or approval of the instructive feedback by the instructor terminal 14. The second feedback management technique may be employed where the instructor comprises a grader, a mentor, a teaching assistant, or another person who is not expected to exercise a great latitude of independent judgment in the provision of instructive feedback, for example.

Figure 2:
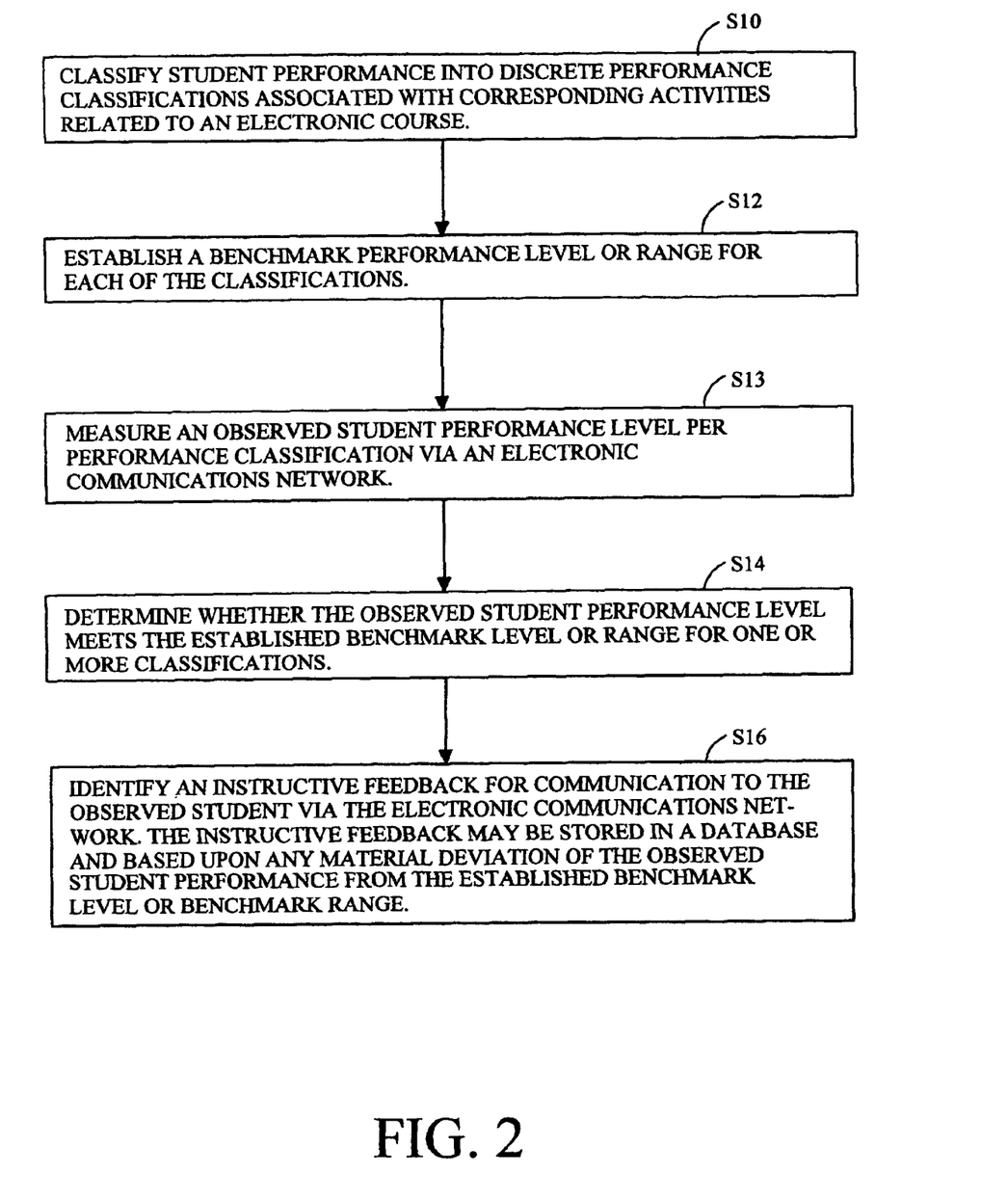
FIG. 2 is a flowchart of a method for analyzing student performance in an electronic course in accordance with the invention.

FIG. 2 is a flowchart of a method for analyzing student performance in accordance with the invention. The method of FIG. 2 starts in step S10.

In step S10, a monitor 22 classifies student performance into discrete performance classifications associated with corresponding activities of an electronic course. In one example, the monitor 22 classifies student performance into one or more of the following performance classifications: assignments, problems, self-assessment tests, scenarios, subject matter overviews, course content overviews, subject summaries, directed problems, presentations, course participation, course attendance, and student communications. Each of the performance classifications may be associated with a distinct classification identifier to support tracking of student activity of student identifiers associated with corresponding classification identifiers.

An assignment refers to student work that is assigned to one or more students enrolled in the electronic course. The assignment may be associated with a due date by which the student is expected to submit a satisfactorily completed assignment.

Problems may refer to questions or other work that is available for an instructor to assess the performance, progress, or comprehension of a student in an electronic course. In contrast, self-assessments may refer to questions or other work that is available to a student, but not necessarily accessible to the instructor. The student may use the self-assessment to assess privately the student's performance, progress, or comprehension in the electronic course.

A scenario may represent an example or presentation of a concept of a course applied in a plausible context in which the concept might or could occur realistically outside the electronic course.

The course content overviews may include a nutshell description of the course content or a description of a substantive subject matter taught in the course.

Course participation may measure the frequency and/or duration of interaction of a particular student with respect to other students and the instructor of a particular electronic course.

Course attendance may be defined as the duration for which a particular student is enrolled in a course or the duration for which the particular student actively participates in an electronic course or components of an electronic course. The course attendance may be measured by the student terminal 10 logging on to the data processing system 18 and using certain components of the electronic course or using the resources of the data processing system 18 to view course materials.

A guided problem may be a problem that has embedded resources (e.g., student-selectable presentations) or other instructional guidance for solving one or more problems or questions presented.

A presentation may comprise one or more of the following: a multi-media presentation, a visual presentation, an audio presentation, a video clip, an audio clip, a textual presentation, an article, and an embedded presentation accessible via an electronic course.

A student communication may comprise one or more of the following: an asynchronous communication, a synchronous communication, a chat data message, and a bulletin board posting. As used herein, an asynchronous communication refers to a communication where (1) data is not exchanged in real-time among the participants of the communication or (2) the participants are not on-line (e.g., logged onto the Internet) simultaneously. A synchronous communication refers to (1) a communication where data is exchanged in real-time among the participants or (2) where the participants are on-line (e.g., logged onto the Internet) at different, non-contemporaneous times. A chat data message is an example of a synchronous communications message, whereas a bulletin board posting or a threaded discussion is an example of an asynchronous communications data message.

A student communication may comprise a data message conveyed between one or more student terminals 10 and an instructor terminal 14 via the communications network 16. Real-time or synchronous communications refer to communications in which the transmission and receipt of messages is contemporaneous or occurs within a certain maximum interval of one another. The maximum interval may coincide with what is expected in a typical face-to-face conversation between two people.

In step S12, the analyzer 24 assesses or establishes a benchmark performance level or range for one or more respective performance classifications. The benchmark performance levels may be stored in the database 32 in the form of a lookup table, a graphical form, a mathematical form, a series of one or more mathematical equations, or in any other suitable data structure. The analyzer 24 may access the database 32 to retrieve benchmark performance levels for each of the respective performance classifications based upon a performance classification identifier and a course identifier for the electronic course.

A benchmark performance level may be representative of the performance level for a model student who performs to an expected degree in the electronic course. For example, the benchmark performance level may be defined as a minimum number of student clicks for a corresponding performance classification. A student click refers to a switch closure or a state change of a pointing device associated with a student terminal 10 of an observed student. A pointing device may comprise a mouse, a track ball, a keyboard input, a switch, or another input of the student terminal 10. The benchmark performance level for each classification may represent a range of student clicks. The range of student clicks refers to a number of clicks bounded by a minimum acceptable number of clicks and a maximum acceptable number of clicks for a particular observed student in a certain electronic course.

In step S13, a monitor 22 measures an observed student performance level per performance classification via an electronic communications network 16. For example, the monitor 22 tracks the number of clicks of a pointing device associated with the student terminal 10 of a particular student in each of the discrete performance classifications. The student clicks may be tracked by the number of click per duration (e.g., a week) within a performance classification, the number of student clicks per user session during which the particular student is logged on to the data processing system 18 via the student terminal 10, and the number of clicks per module or component of an electronic course.

In step S13, the observed student performance level may be stored in a database 32. The database 32 may contain student identifiers and observed performance levels associated with these student identifiers. Further, the database 32 may include benchmark performance levels for performance classifications associated with at least one corresponding electronic course.

In step S14, the analyzer 24 analyzes student performance of a particular student with respect to one or more of the discrete performance classifications. For example, the observed student performance level is compared to a corresponding benchmark level or range for a particular classification identifier to determine whether the particular student in a particular electronic course complies with a benchmark performance level for the performance classification. The observed performance level may be compared to the established benchmark level or range for one or more performance classifications. For example, the observed performance level may be compared to the established benchmark level or range for a group of the classifications as a whole. A group of performance classifications may be referred to collectively as a benchmark student activity pattern.

In step S16, the feedback generator 26 identifies an instructive feedback for the student for communication to the observed student terminal 10 via the electronic communications network 16. The instructive feedback may be tailored to the observed student based upon any material deviation of the student's performance level from the benchmark performance level. The instructive feedback may be tailored based upon one or more identified deficient classifications of the particular student in a certain electronic course.

The instructor may be provided with the option of selecting between more than one instructive feedback. For example, the instructor may not only be given the ability to send an e-mail to the student to discuss the last nutshell the student has read, the instructor may also encourage the student to confirm the student's understanding of a discussion thread associated with a subject matter of at least one of the last nutshells. The latter course of action may be particularly effective where other students in the course grasp the key concepts and the instructor has limited resource 17 or time to follow up with the student.

The instructive feedback may refer to a corrective action to improve an identified deficiency of a particular observed student in an electronic course. Further, the instructive feedback may include positive reinforcement or compliments to congratulate a student that meets or exceeds the benchmark performance level in a particular electronic course. In one example, the feedback generator 26 may generate compliments for those classifications of a student activity pattern in which a particular student meets or exceeds a performance goal.

Similarly, the feedback generator 26 may develop instructive feedback on a classification-by-classification basis where any classification in which the particular student does not meet the benchmark performance level results in the generation of a instructional feedback that tells the observed student to spend more time in a particular classification. For example, if the observed student performs deficiently in the number of clicks in the assignment classification, the feedback generator 26 generates a feedback message for provision to the particular student terminal 10 that advises the student to spend more time on the assignment(s). Similarly, if the particular student does not perform up to the relevant benchmark performance level in the problem classification, the feedback generator 26 may advise the student to spend more time solving the problems. Thus, the classification-by-classification feedback may assist the observed student in allocating his time appropriately in various aspects of the electronic course to achieve an enhanced learning process that would not be otherwise obtainable by traditional classroom techniques.

The analyzer 24 and the feedback generator 26 cooperate in steps S14 and S16 to provide instructive feedback in accordance with several alternate techniques. In accordance with a first example of the interplay between steps S14 and S16, the analyzer 24 detects that a particular student has participated in a nutshell or subject matter summary to a greater extent than a benchmark level of nutshell participation. Further, the analyzer 24 detects that the particular student has performed to a lesser degree of competence than an average performance or mean performance of other students enrolled in the same electronic course. For example, the particular student may have a lesser observed performance level in assignments than an aggregate performance level for assignments (or a benchmark performance level for assignments) of other students in the same electronic course. Accordingly, in step S16 the feedback generator 26 accepts the input from the analyzer 24 on the nutshell participation level and the average performance or mean performance of all students enrolled in the electronic course and generates instructive feedback (e.g., a data message or e-mail) for sending to the student terminal 10 to discuss the last nutshell the student has read. The instructor may enrich the student's educational experience by explaining the nutshell and the student's performance may improve if the student was having difficulty comprehending the nutshell.

In a second example of the interplay between steps S14 and S16, the analyzer 24 detects an observed performance level where a particular student has participated in a nutshell to a greater extent than a benchmark level of nutshell participation. However, the overall performance level of the student was lesser than an average performance or mean of other students enrolled in the electronic course. In step S16, the feedback generator 26 accepts the information from the analyzer 24 on the observed nutshell participation level, the benchmark level of nutshell participation, the overall average performance of students in the electronic course, and the performance of the particular student in the electronic course. The feedback generator 16 outputs instructive feedback that includes encouraging the student and confirming the student's understanding of a student communication (e.g., discussion thread) associated with the subject matter of at least one nutshell to bolster the effectiveness of the nutshell.

In a third example of the interplay between steps S14 and S16, the analyzer 24 in step S14 may detect that a certain task or tasks are completed and may provide instructive feedback comprising a congratulation message to the student on successful completion of the task or tasks. Successful completion of a task may be defined as the analyzer's detection that the student has completed a certain task and exceeds the benchmark performance level for one or more classifications. For example, the analyzer 24 may detect that a student has successfully completed self-assessment and in step S16 the feedback generator 26 may generate instructive feedback including a congratulation message that the student has successfully completed the self-assessment.

The feedback generator 26 may generate an instructive feedback for acceptance or modification by the instructor that includes a congratulation message for delivery to the student terminal 10 of the observed student. For example, the feedback generator 26 may generate a data message, such as "Good job" or "Keep up the good work" for delivery to the student terminal 10 via the communications network 16. Accordingly, the method of the invention may not only address problems and corrective actions to provide to deficient student performance, but may enhance student performance by favorable feedback where the student exceeds the performance goals provided in the benchmark performance level.

Figure 3:
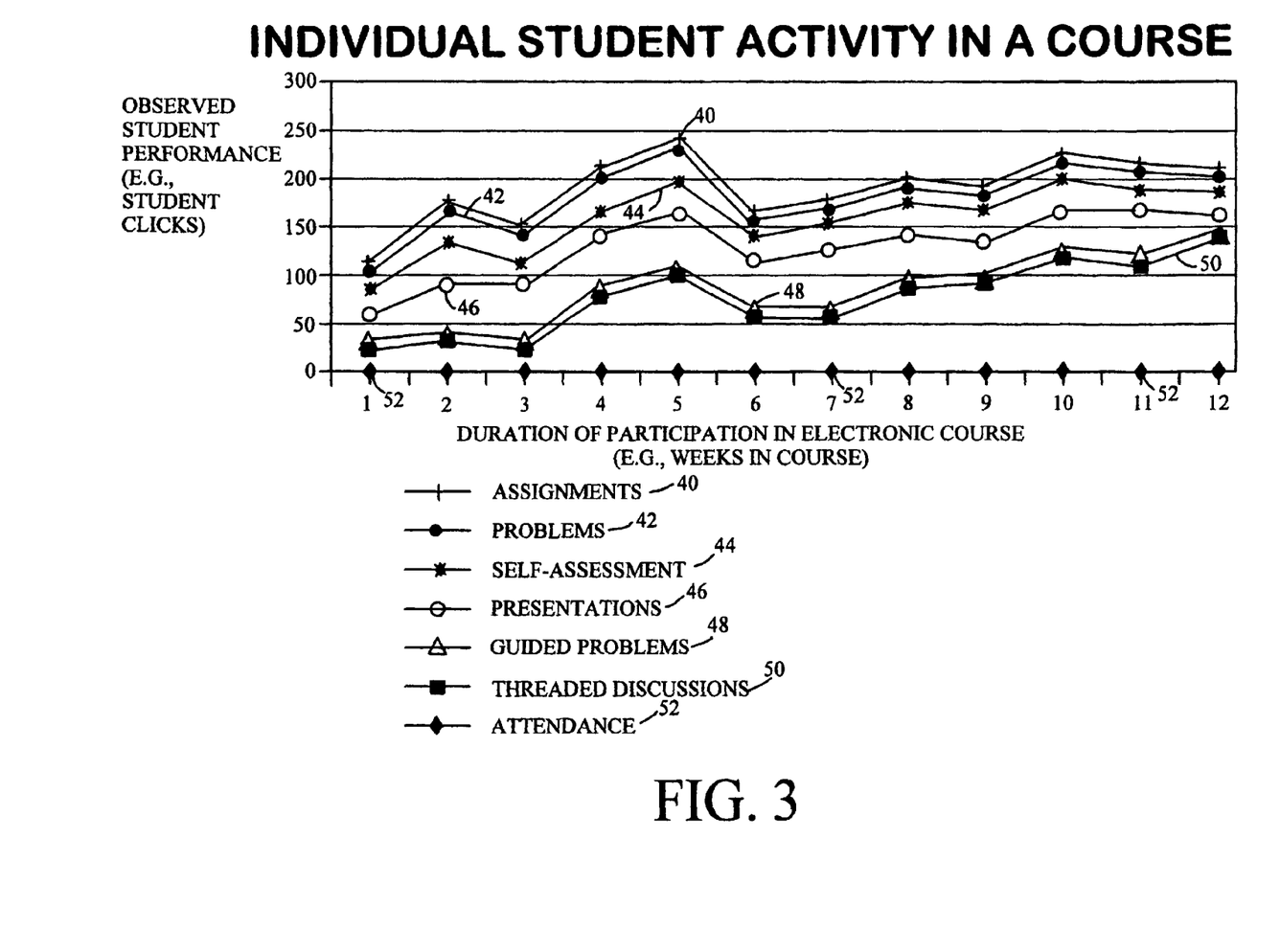
FIG. 3 is an illustrative graph of an observed student activity pattern or observed performance levels for a representative student in an electronic course.

FIG. 3 shows a graph of observed student performance level, in various performance classifications, versus duration of participation in an electronic course in accordance with the invention. The horizontal axis of the graph of FIG. 3 represents the duration of a particular student's participation 52 in an electronic course in units of time (e.g., weeks). The vertical axis represents an observed level of student performance or activity, which can be measured as the number of student clicks per interval or course module within the course. The student clicks refer to switch closures of a pointing device of a student terminal 10 of a particular student, for example.

The observed student performance level per classification may deviate from a benchmark performance level or range. For example, the observed student performance level may deviate from that of a preferred or model student within a certain range. The benchmark performance levels may be defined as a range of student clicks. As shown in FIG. 3, the performance classifications include: assignments 40, problems 42, self-assessment test 44, presentations 46, guided problems 48, threaded discussions 50, and attendance 52 in the electronic course. A group of observed performance classifications may be referred to collectively as an observed student activity pattern.

In an alternate embodiment, the performance classifications include: assignments 40, problems 42, self-assessment test 44, presentations 46, guided problems, threaded discussions 50, attendance 52, illustrative stories, and nutshells in the electronic course. The applicable performance classifications may be selected based on the total duration of the underlying electronic course, the overall scope of the underlying electronic course, and/or the level of instructor support provided for the underlying electronic course.

The observed student performance levels may provide the student with an indication of how the student has allocated his time in the electronic course as feedback. The benchmark performance level of time or participation may be used to promote efficient studies in which students allocate their time for participation appropriately between the different performance classifications. The appropriate time allocation for participation of students may enhance the learning process by fostering the students' ability to better balance their time between various aspects (e.g., performance classifications) of the electronic course.

In the illustrated example of FIG. 3, the particular observed student has a measured performance as follows with respect to various performance classifications. The student spends a majority of his time or participation on the assignments 40 and the second most time on the problems 42. The student allocates the third greatest amount of his time or participation in the self-assessment tests 44. The student allocates the fourth greatest amount of his time or participation 52 in presentations 46. The student participated in the guided problems 48 to a lesser extent than the preceding four classifications. The student allocates the least of time or participation 52 to the threaded discussions 50. The student has participated in each durational interval or module (e.g., a module associated with week 1) of the electronic course on a consistent basis as indicated by the observed attendance 52 appearing on the horizontal axis. The observed student performance levels and corresponding performance classifications of FIG. 3 are provided for illustrative purposes, the actual observed performance level of any student may differ from that shown and different performance classifications may be used.

Figure 4:
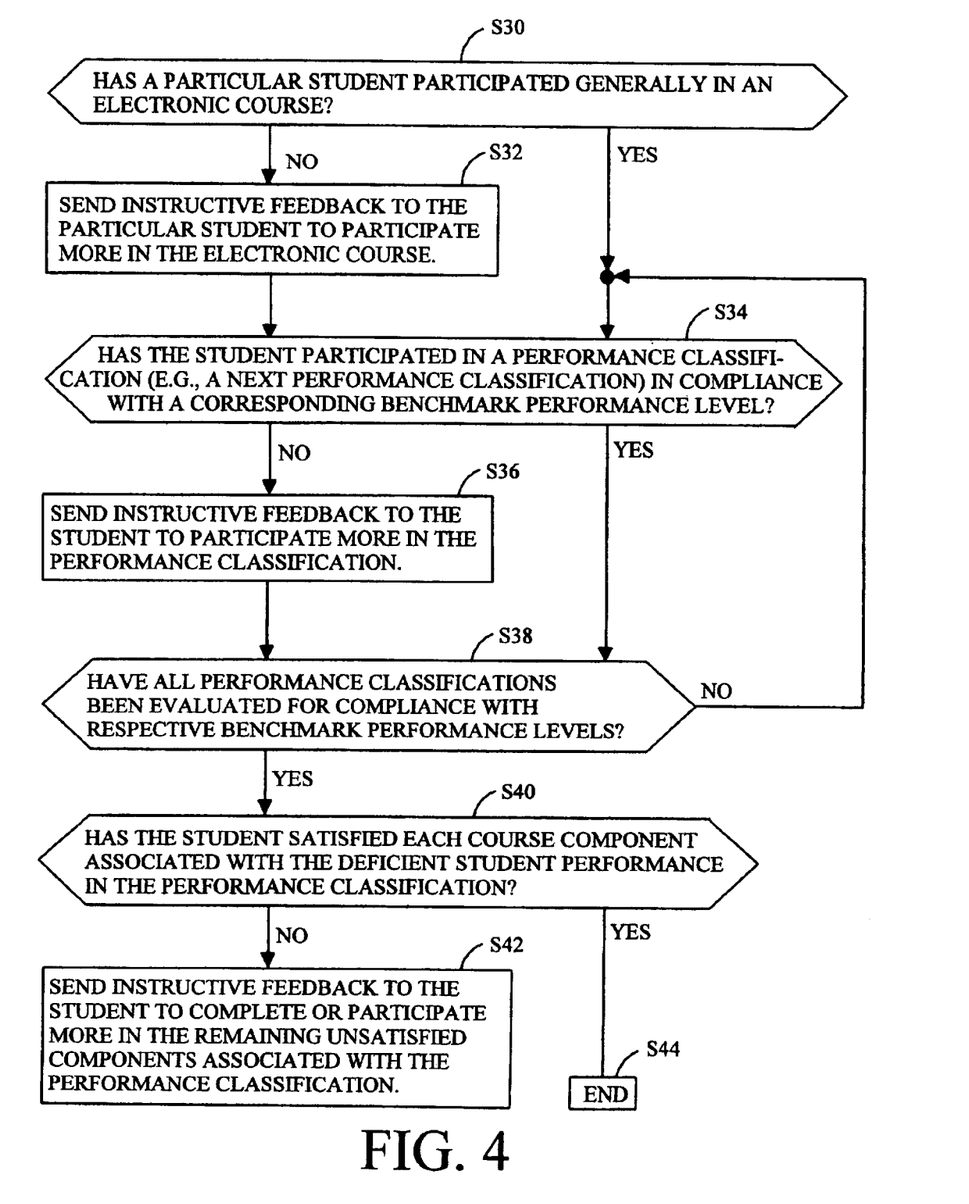
FIG. 4 is a flowchart of one example of a method for generating instructional feedback for a student based on an analysis of student performance.

FIG. 4 shows an example of a flow chart for providing instructive feedback to a student. The method of FIG. 4 starts in step S30.

In step S30, an instructor terminal 14 or a data processing system 18 determines if a particular student has participated generally in an electronic course. The instructor terminal 14 or the data processing system 18 may reference an observed student performance level of attendance stored in the database 32. For example, the instructor terminal 14 may access the database 30 via the communications network 16 and the data processing system 18 to obtain the observed performance level of attendance of a particular student. If the observed performance level of attendance meets a benchmark performance level of attendance, the method continues in step S34. However, if the observed performance level of attendance fails to meet or exceed the benchmark performance level, the method continues in step S32.

In step S32, the instructor terminal 14 supports sending of instructive feedback to the particular student terminal 10 to participate more in the electronic course. The particular student may be reminded of a minimum attendance requirement in a data message necessary to achieve a passing grade or credit for taking the electronic course, for example.

In step S34, the instructor terminal 14 or the data processing system 18 determines if the student has participated in a particular performance classification in compliance with a corresponding benchmark performance level. The instructor terminal 14 may access the database 32 to compare observed performance levels to benchmark performance levels for any performance classification other than general course attendance, which was already checked in step S30. For example, the data processing system 18 may evaluate the observed student performance level in one or more of the following performance classifications: assignments, problems, self-assessment tests, illustrative stories, nutshells, guided problems, presentations, threaded discussions, and attendance.

If the observed student performance level for a particular student does not comply with the corresponding benchmark performance level, the method continues with step S36. However, if the observed student performance level for the particular student complies with the corresponding benchmark performance level, the method continues with step S38.

In step S36, the instructor terminal 14 supports sending of instructive feedback to the student terminal 10 to participate more in the particular deficient performance classification identified in step S34. Following step S36 or step S34, the method continues with step S38.

In step S38, the instructor terminal 14 or the data processing system 18 determines if a defined group or all of the performance classifications, for which observations of a particular student are available, have been evaluated. If all of the performance classifications or a defined group of the performance classifications have been evaluated, then the method continues with step S40. However, if not all of the performance classifications have been evaluated, then the method returns to step S34 where the student participation in the next performance classification in the defined group is considered.

In step S40, the instructor terminal 14 or the data processing system 18 determines if the student has satisfied each course component associated with the deficient student performance in the performance classification. In one example, the instructor terminal 14 or the data processing system 18 may track whether or not a student has completed requisite course components of the electronic course. The course components may be differentiated from one another by subject matter or otherwise. In another example, the instructor terminal 14 or the data processing system 18 may track whether or not a student has completed activities or complied with performance classifications associated with one or more course components. If the student has not satisfied each course component associated with the deficient student performance, the method continues with step S42. However, if the student has fulfilled each course component associated with the deficient student performance, the method ends in step S44.

In step S42, the instructor terminal 14 or the data processing system 18 sends instructive feedback to the student terminal 10 to complete or participate more in the remaining unsatisfied components associated with the performance classification.

Figure 5:
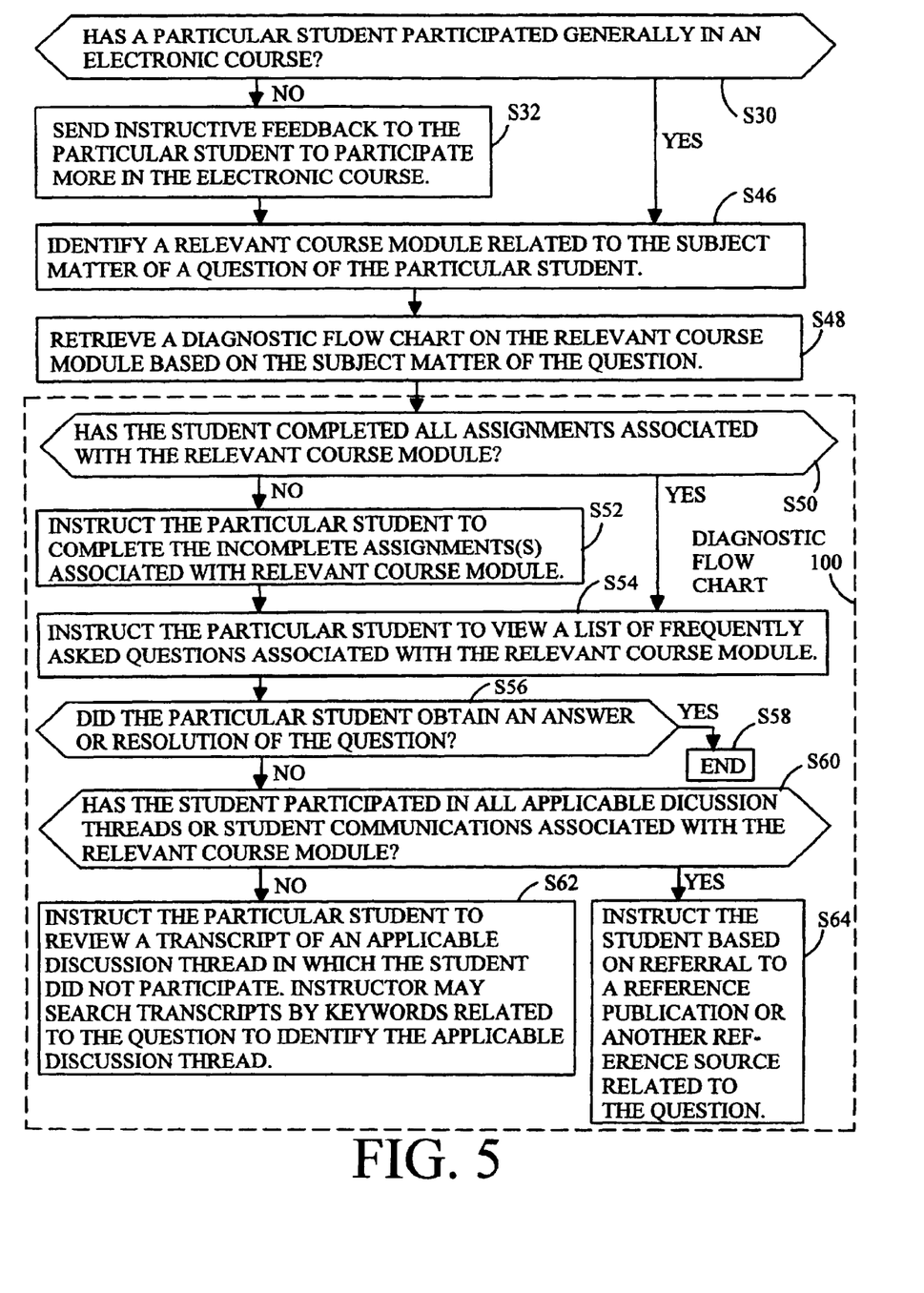
FIG. 5 is a flowchart of another example of a method for generating instructional feedback for a student based on an analysis of student performance.

FIG. 5 shows an example of a flow chart for providing instructive feedback to a student. Like steps in FIG. 4 and FIG. 5 are indicated by like elements.

Step S46 follows step S30 or step S32. In step S46, an instructor identifies a relevant course module related to the subject matter of a question of a particular student. The student may ask a substantive question that contain key words or phrases that allow the instructor to identify a relevant course module based on an instructor's interpretation of an index, a list of course modules, a syllabus of the electronic course, or a representation of the relevant subject matter.

In step S48, an instructor terminal may retrieve a diagnostic flow chart 100 on the relevant course module based on the subject matter of the question. A set of diagnostic flow charts may be associated with a corresponding electronic course. Sets of diagnostic flow charts for various respective electronic courses may be stored in the database 32. In one embodiment, the diagnostic flow chart is represented by the steps of the method of FIG. 5 that are enclosed by the dashed line, labeled 100.

A diagnostic flow chart 100 may have a tree structure that includes logically, mutually exclusive branches for identifying the instructional feedback. The diagnostic flow chart 100 may include questions on what course modules or course components that the student has successfully completed, unsuccessfully completed, or not completed. The questions may also include questions about the student's performance in various course components or course modules. As each question is answered, the successive questions attempt to narrow down or further define the problem. In one example, eventually the problem may be narrowed down to one or more possibilities that are associated with advice or corrective actions or other instructive action aimed at solving the problem.

The one or more possibilities that remain represent preliminary instructional feedback. The instructor may review preliminary instructional feedback via the instructor terminal 14 to modify or supplement the preliminary instructional feedback so as to form resultant instructive feedback. The resultant instructive feedback may be based upon the instructor's judgment and observations (e.g., student-instructor communications) to tailor the preliminary instructional feedback for applicability to the particular circumstances and student at hand.

In step S50 after step S48, the instructor terminal 14 or the data processing system 18 determines if the particular student has completed all assignments associated with the relevant course module. If the student has not completed all assignments associated with the relevant course module, the method continues with step S52. However, if the student has completed all assignments associated with the relevant course module, then the method continues with step S54.

In step S52, the instructor terminal 14 or the data processing system 18 instructs the particular student to complete the incomplete assignment or assignments associated with the relevant course module. For example, the data processing system 18 may send the particular student a data message that identifies a list of incomplete assignments.

In step S54, the instructor terminal 14 or the data processing system 18 instructs the particular student to view a list of frequently asked questions and answers associated with the relevant course module. The list of frequently asked questions may address the question posed by the particular student. The list of frequently asked questions may be developed by interaction or feedback from previous students or test subjects of the electronic course.

In step S56, the instructor terminal 14 or the data processing system 18 determines whether the particular student obtained an answer or resolution of the question. For example, the instructor terminal 14 may send a data message to the student asking the student if the student now understands after the receipt of the instructive feedback in at least one of step S52 and step S54. If the particular student indicates that he or she obtained an answer or resolution, the method ends in step S58. However, if the particular student did not obtain an answer or resolution, the method continues with step S60.

In step S60, the instructor terminal 14 or the data processing system 18 determines whether the particular student, who asked the question, has participated in all of the relevant student communications associated with the relevant course module. The student communications may comprise one or more of the following: asynchronous communications, synchronous communications, chat communications, threaded discussions, and real-time conferences. A real-time conference entails a period of generally continuous and successive communications between one or more of the following: a student terminal 10, a group of student terminals 10, and an instructor terminal 14. If the student has participated in all of the relevant student communications, the method continues with step S64. If the student has not participated in all of the relevant student communications, then the method continues with step S62.

In step S62, the instructor terminal 14 or the data processing system 18 instructs the particular student to review a transcript of an applicable discussion thread or student communication in which the student did not participate. For example, the instructor may search transcripts by keywords related to the question to identify the applicable discussion thread.

In step S64, the student terminal 10 or the data processing system 18 instructs the student based on a referral to a reference publication or another reference source related to the question. The reference publication may represent a textbook, a resource supported by the data processing system, or a resource 17 coupled to the communications network 16.

The diagnostic flowchart 100 of FIG. 6 supports the instructor's ability to explain a particular concept in the subject matter of the electronic course. As shown in FIG. 6, the instructor proceeds from the top of the diagnostic flowchart 100 to the bottom of the diagnostic flowchart 100 following the appropriate branch with each successive answers to the questions posed in the diagnostic flow chart. The diagnostic flow chart directs the instructor to solutions, which may progressively narrow in the scope of the possible solutions in the progression from the top of the flow chart to the bottom. In one embodiment, the possible solutions are representative of preliminary instructional feedback, which may be filtered or otherwise altered prior to delivery to student terminals 10, as final or resultant instructive feedback.

The foregoing description of the method and system of the invention describes several illustrative examples of the invention. Modifications, alternative arrangements, and variations of these illustrative examples are possible and may fall within the scope of the invention. Accordingly, the following claims should be accorded the reasonably broadest interpretation which is consistent with the specification disclosed herein and not unduly limited by aspects of the preferred embodiments disclosed herein.

I claim:

1. A method of analyzing student performance in an electronic course, the method comprising:

classifying student performance into discrete performance classifications associated with compounding activities;

establishing a benchmark performance level for each of the performance classifications;

measuring an observed student performance level for at least one of the performance classifications;

determining whether the observed student performance level is compliant with the established benchmark performance level for the at least one performance classification; and identifying an instructive feedback for the individual based upon (a) any material deviation of the observed student performance level from the benchmark performance level and (b) an identity of the at least one performance classification of deficient student performance;

wherein the determining detects that a particular student has participated in a nutshell classification to a greater extent than a benchmark level and wherein an overall performance level of the particular student is lesser than an average performance level or mean performance level of other students enrolled in the same electronic course.

2. The method according to claim 1 wherein the discrete performance classifications comprise at least one of assignments, problems, self assessment tests, scenarios, course content overviews, subject summaries, student communications, course participation, guided problems, presentations, multimedia presentations, audio presentations, and visual presentations.

3. The method according to claim 1 wherein the measuring includes tracking a number of clicks of a pointing device associated with a particular student terminal in the discrete performance classifications.

4. The method according to claim 3 wherein the benchmark performance level for each performance classification represents a range of student clicks, bounded by a minimum acceptable number of clicks and maximum acceptable number of clicks.

5. The method according to claim 1 further comprising sending a data message as instructive feedback to the particular student to discuss at least one nutshell related to the same electronic course.

6. The method according to claim 1 further comprising sending a data message as instructive feedback to encourage the student to confirm the student's understanding of a student communication associated with the subject matter of at least one of the nutshells associated with the same electronic course.

7. The method according to claim 1 wherein the determining detects that a particular student has successfully completed a self-assessment test and wherein the instructive feedback comprises congratulating the particular student on completing the self-assessment test.

8. The method according to claim 1 wherein the instructive feedback comprises a corrective action to improve an identified deficiency of the student in the electronic course.

9. The method according to claim 1 further comprising maintaining a database contain student identifiers, observed performance levels associated with the student identifiers, performance classification identifiers associated with the student identifiers, and benchmark performance levels associated with at least one corresponding electronic course.

10. The method according to claim 1 wherein the discrete performance classifications comprise a plurality of discrete performance classifications selected from assignments, problems, self assessment tests, scenarios, course content overviews, subject summaries, student communications, course participation, guided problems, presentations, multimedia presentations, audio presentations, and visual presentations.

* * * * *